Feb. 10, 1953  R. L. ANDERSON  2,628,321
ELECTRIC MOTOR BRAKE-COUPLING ASSEMBLY
Filed Dec. 19, 1951
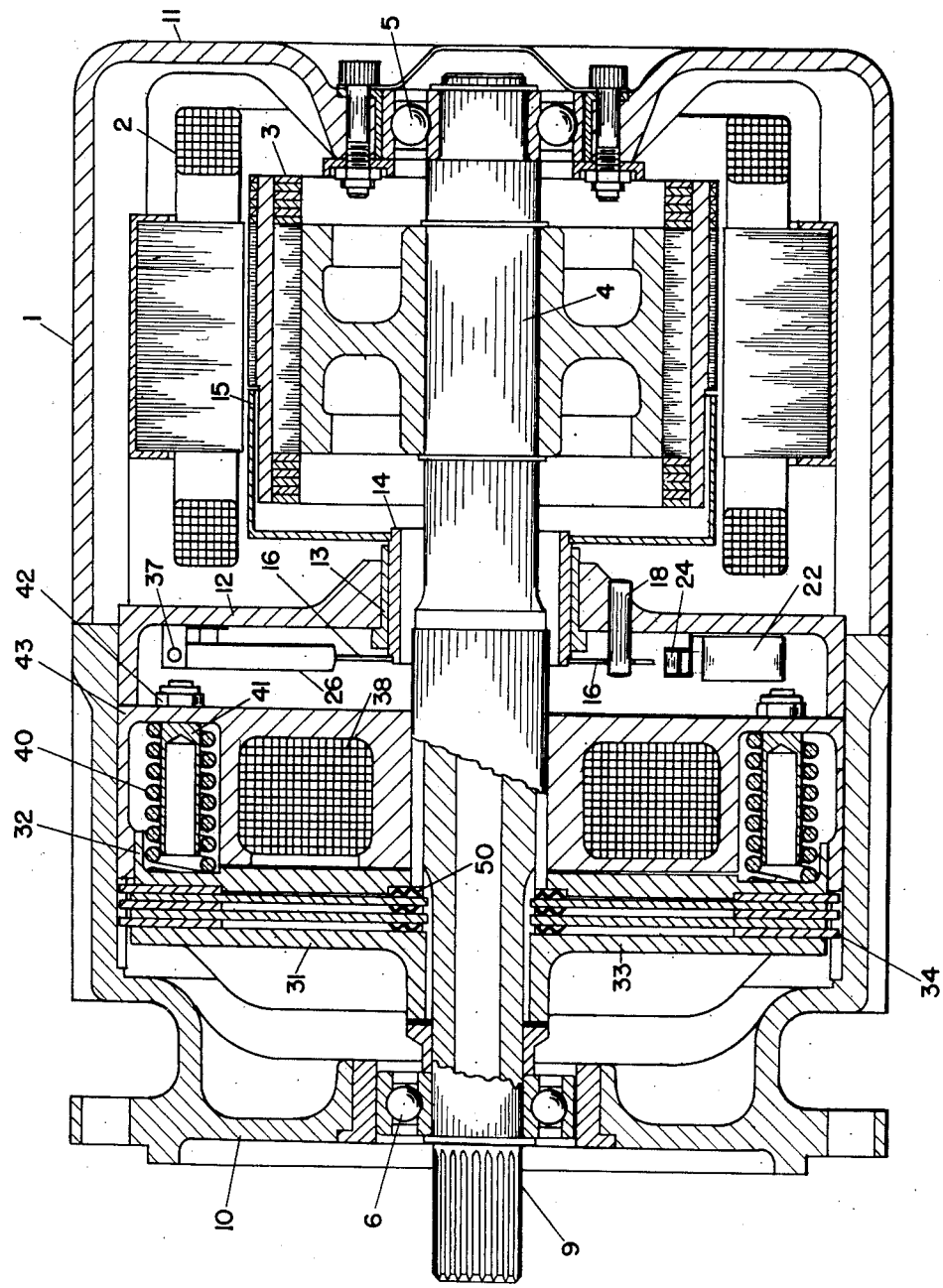
INVENTOR.
ROBERT L. ANDERSON
BY
ATTORNEY Patented Feb. 10, 1953

UNITED STATES PATENT OFFICE 2,628,321

2,628,321
ELECTRIC MOTOR BRAKE-COUPLING ASSEMBLY

Robert L. Anderson, Garfield Heights, Ohio, assignor to Jack & Heintz, Inc., Cleveland, Ohio, a corporation of Delaware Application December 19, 1951, Serial No. 262,392

4 Claims. (Cl. 310—77)

This invention relates to automatic means for controlling and regulating the release and application of braking means upon a motor driven rotary shaft, and is a continuation in part of a copending application of Omar C. Walley and Robert L. Anderson for Actuator, Serial No. 240,392.

One of the primary objects of the invention is to provide a motor driven actuator including a brake for normally engaging the rotary actuator shaft together with means whereby the brake will be quickly released upon manual control to start the motor and whereby the brake will also be quickly reapplied automatically upon stopping of current supply to the motor in order to avoid coasting of the actuator shaft so as to enable proper adjustment of the device being actuated.

Another object is to provide in combination with a brake that is spring urged to normally brake the actuator shaft, a motor, and an electromagnet, which when energized upon supply of current to the motor, will act effectively as a brake release for actuator shaft.

To accomplish these objects it is proposed to provide a friction disc brake normally spring pressed to brake the actuator shaft. It is further proposed to employ an A. C. motor having a rotor and a stator. Interposed between the rotor and stator is mounted a drag cup in spaced relation to both. Upon starting the A. C. motor certain electrical phenomena occur, such as eddy currents, between the stator and drag cup, the effect of which is to rotate the drag cup. The device also includes a D. C. current electromagnet including coils and a slidable armature that is normally spring pressed to apply the brake. The drag cup carries a cam normally spring biased to neutral position and limits are provided for its rotative movements in both directions. Upon starting the A. C. motor the cam actuates a micro switch to energize the electromagnet to slidably move the armature to release the brake against the action of the spring. The brake is automatically reapplied quickly upon stopping of current supply to the A. C. motor.

With the foregoing and other objects in view the invention resides in the combination of parts and in the details of construction hereinafter set forth in the following specification and appended claims, certain embodiments thereof being illustrated in the accompanying drawing which is a view in longitudinal section of one form the invention may take.

Referring more particularly to the drawing, the device as shown comprises a housing 1, an A. C. motor including a stator 2 and a rotor 3 carried by a motor supporting the actuator shaft 4 rotatably mounted in end bearings 5 and 6. The output end of actuator shaft 4 is splined at 9.

Intermediate the two end walls 10 and 11 of housing 1 is a centrally apertured wall 12 carrying a bearing sleeve 13 for a hollow sleeve 14 that surrounds shaft 4 with appreciable clearance. Sleeve 14 is a rigid part of a drag cup 15 that is annularly spaced with clearance between the rotor 3 and stator 2 of the A. C. motor. Rigidly secured to sleeve 14 is a cam plate 16. Cam 16 is provided with an arcuate slot to receive a stationary pin 18 secured to housing wall 12 to form a limit stop means for the cam 16. A micro switch is generally indicated by its casing 22. The cam is spring biased into this position by a leaf spring 26 secured to a bracket 37 carried by housing wall 12 in a manner similar to that disclosed in the aforesaid copending application.

The device also includes a braking mechanism for the actuator shaft 4. This includes an end plate 31 that is longitudinally splined to shaft 4 and an end plate 32 that is unsplined to but slidable longitudinally of the shaft. Between the two end plates 31 and 32 are arranged a series of friction brake discs and alternately arranged brake discs 34, the former of which are splined to the shaft and the latter of which are splined to the housing. A stationary frame cage 43 houses non-permanent non-rotary magnet 38. To cage 43 is also secured by nut 42 a bolt 41 around which is wrapped a compression coil spring 40 confined between plate 32 and wall 43. The normal action of spring 40 is to maintain the friction brake discs compressed between rotary plate 31 and non-rotary plate 32, so as to maintain the actuator shaft 4 braked against rotation. However, when power is applied to the A. C. motor by suitable manual switch control the drag cup rotates. This causes the drag cup 15 and its cam 16 to be rotated against the action of leaf spring 26 within the prescribed limits. As this occurs, and sensitive in either direction of rotation of the drag cup, micro switch 22 is closed. This supplies D. C. current from a suitable source to energize the electromagnet to cause plate 32 to slide to the right as the armature of a solenoid against the action of spring 40 to release the compression of the brake discs and to release the brake on actuator shaft 4. The rotor 3 then drives through.

Moreover, as slidable plate, or armature, 32 moves to the right to release the compression on the brake discs, it is magnetically attracted by magnet 38 of the electromagnet which has been energized by the closing of micro switch 22 by the cam 16. When current supply to the stator of the A. C. motor is cut off, the cam is centered and the micro switch opened to deenergize the magnet. The spring 40 then takes over to once again apply the brake to the actuator shaft 4. In this arrangement, when the output portion of the actuator is braked the motor rotor supporting portion of the shaft is simultaneously braked. Small light springs 50 are preferably employed between the clutch plates 33 and 34 to assist their longitudinal separation in the brake release operation when electromagnet 38 is energized.

Thus there is provided a friction disc brake for the output portion of the rotary actuator shaft which brake is normally spring pressed to apply the brake. Part of the brake assembly is a solenoid that is normally deenergized. When it is desired to rotate the actuator shaft, power is supplied to the A. C. motor to start the same. The effect of the electrical phenomena on the drag cup is to rotate it within prescribed limits, against the action of a leaf spring on the cam carried by the drag cup. The cam in forced extended position operates a micro switch to energize the solenoid and one of the brake disc supporting plates acts as an armature and is moved longitudinally against spring opposition to release the friction disc brake from any braking action on the actuator shaft. This continues until a cut off of power to the A. C. motor, after which the cam is returned quickly to normal and the micro switch is opened and the brake is again quickly applied by its spring to brake the actuator shaft.

I claim:

1. In combination in a rotary shaft actuator, a motor comprising a stator, a rotor radially spaced therefrom, a rotary actuator shaft supported by said housing, a friction disc brake assembly including discs alternately splined to said shaft and to said housing and held between a plate splined to said shaft and an armature axially slidable thereon, spring means for normally compressing said discs for braking said output shaft portion against rotation, said spring means being arranged between the housing and said armature, a normally deenergized electromagnet, said armature being normally longitudinally spaced from said brake assembly, a normally open switch means for supplying current to energize said electromagnet, a drag cup mounted for rotation in said housing and mechanically free of said rotor and its supporting shaft, part of said drag cup being disposed in spaced relation between said rotor and stator, means for normally maintaining said switch open, said drag cup, upon applying of A. C. power, being subjected to electrical forces to close the switch to supply current to said electromagnet to magnetically attract and slidably move the adjacent armature of said brake assembly against the action of its disc compressing spring means to release the braking action on said shaft.

2. In combination in a rotary shaft actuator, a housing, a motor comprising a stator, a rotor radially spaced therefrom, a rotary actuator shaft supported by said housing including a rotor supporting portion and an output portion, a friction disc brake assembly including discs alternately splined to the output portion of said shaft and to said housing and held between a plate splined to said shaft and an armature axially slidable thereon, spring means for normally compressing said discs for braking said output shaft portion against rotation, and arranged between the housing and said armature, a normally deenergized electromagnet, said armature being normally longitudinally spaced from said brake assembly, a normally open switch means for supplying current to energize said electromagnet, a drag cup mounted for rotation in said housing and mechanically free of said rotor and its supporting shaft, part of said drag cup being disposed in spaced relation between said rotor and stator, means for normally maintaining said switch open, said drag cup, upon applying of A. C. power, being subject to electrical forces to close the switch to supply current to said electromagnet to magnetically attract and slidably move the adjacent armature of said brake assembly against the action of its disc compressing spring means to release the braking action on the output shaft.

3. In combination in a rotary shaft actuator, a housing, a motor comprising a stator, a rotor radially spaced therefrom, a rotary actuator shaft supported by said housing including a rotor supporting portion and an output portion, a friction disc brake assembly including discs alternately splined to the output portion of said shaft and to said housing, and held between a plate splined to said shaft and an armature axially slidable thereon, spring means for normally compressing said discs for braking said output shaft portion against rotation, and arranged between the housing and said armature, a normally deenergized electromagnet comprising a coil and a non-permanent magnet, said armature being normally longitudinally spaced from said brake assembly, a normally open switch means for supplying current to energize said electromagnet, a drag cup mounted for rotation in said housing and mechanically free of said rotor and its supporting shaft, part of said drag cup being disposed in spaced relation between said rotor and stator, means for normally maintaining said switch open, said drag cup, upon applying of A. C. power, being subjected to electrical forces to close the switch to supply current to said electromagnet to magnetically attract and slidably move the adjacent armature of said brake assembly against the action of its disc compressing spring means to release the braking action on the output shaft.

4. In combination in a rotary shaft actuator, a housing, a motor comprising a stator, a rotor radially spaced therefrom, a rotor actuator shaft supported by said housing including a rotor supporting portion and an output portion, a friction disc brake assembly including discs alternately splined to the output portion of said shaft and to said housing, and held between a plate splined to said shaft and an armature axially slidable thereon, spring means for normally compressing said discs for braking said output shaft portion against rotation, and arranged between the housing and said armature, a normally deenergized electromagnet comprising a coil and a non-permanent magnet, said armature being normally longitudinally spaced from said brake assembly, a normally open switch means for supplying current to energize said electromagnet, a drag cup mounted for rotation in said housing and mechanically free of said rotor and its supporting shaft, part of said drag cup being disposed in spaced relation between said rotor and stator, a cam carried by said drag cup, spring means for normally centering said cam away from said switch, said drag cup, upon applying of A. C. power, being subjected to electrical forces to rotate said cam to close the switch to supply current to said electromagnet to magnetically attract and slidably move the adjacent armature of said brake assembly against the action of its disc compressing spring means to release the braking action on the output portion of said shaft.

ROBERT L. ANDERSON.

REFERENCES CITED

The following references are of record in the file of this patent:

UNITED STATES PATENTS

| Number | Name | Date |
|---|---|---|
| 1,134,739 | Handy | Apr. 6, 1915 |